Patented Dec. 6, 1949

2,490,488

UNITED STATES PATENT OFFICE 2,490,488

HYDROCARBON SYNTHESIS CATALYST

S. Grant Stewart, Bartlesville, Okla., assignor to Phillips Petroleum Company, a corporation of Delaware No Drawing. Application March 28, 1947, Serial No. 737,993

7 Claims. (Cl. 260—449.6)

The present invention relates to hydrogenation processes and to novel catalysts especially adapted to carry out such processes. In a more particular aspect it relates to novel catalysts for the synthesis of hydrocarbons from carbon monoxide and hydrogen, and to a process for such synthesis wherein such catalysts are utilized.

Metals and metal sulfides have in general, found wide use as hydrogenation catalysts particularly in the hydrogenation of mineral, animal, or vegetable oils, in the hydrogenation of unsaturated hydrocarbons, destructive hydrogenation, or in the hydrogenation of carbon monoxide to form $C_1$ and $C_2$ with small amounts of $C_3$ hydrocarbons.

It is known that mixtures of carbon monoxide and hydrogen may be converted under ordinary or elevated pressures and at elevated temperatures over a suitable catalyst to form liquid hydrocarbons and varying minor amounts of oxygen-containing materials. Catalysts for this reaction ordinarily include metals of the eighth group of the periodic system, such as iron, cobalt, nickel and ruthenium. These metals may be used alone as catalysts but other metals or compounds are frequently added as promoters. Such promoters include oxides of thorium, chromium, zinc, beryllium, uranium, silicon, magnesium, manganese, molybdenum, tungsten, aluminum, copper and cerium. The metals of the eighth group, alone or promoted, are of general value as hydrogenation catalysts.

In accordance with the present invention, it has been found that a highly active catalyst especially suitable for hydrogenation reactions may be obtained by associating with molybdenum disulfide, an alkaline promoter such as an alkaline compound of an alkali metal, for example the oxide, hydroxide or the carbonate. Molybdenum disulfide, although an active catalyst with respect to methane formation in the conversion of carbon monoxide-hydrogen mixtures, does not direct the reaction toward the formation of normally liquid products. Thoria, alumina, chromia, etc., which are commonly accepted Fischer-Tropsch catalyst promoters exert no influence on the reaction catalyzed with molybdenum disulfide. It has further been found in accordance with the present invention, that molybdenum disulfide when promoted with minor proportions of an alkaline promoter of the type described, is an active catalyst for the formation of normally liquid hydrocarbons and oxygen-containing compounds via the Fischer-Tropsch reaction.

It is, therefore, an object of the present invention to provide a catalyst for hydrogenation reactions which comprises essentially molybdenum disulfide promoted with minor proportions of an alkaline material. It is a further object of the present invention to provide a novel catalyst for the formation of normally liquid hydrocarbons and organic oxygen-containing compounds by the conversion of carbon monoxide-hydrogen mixtures utilizing such a catalyst. It is an additional object of the present invention to provide a process for the hydrogenation of organic compounds and for the hydrogenation of carbon monoxide utilizing a molybdenum disulfide catalyst promoted with minor proportions of an alkali. A further object of the present invention is the provision of a molybdenum disulfide catalyst promoted with minor proportions of an alkaline alkali metal compound particularly adapted for the synthesis of normally liquid hydrocarbons from carbon monoxide-hydrogen mixtures.

In preparing the novel catalyst of the present invention molybdenum disulfide is admixed with a desired proportion of the alkaline promoter, which is an alkali metal compound having an alkaline reaction, or one which leaves as a residue the corresponding alkali metal oxide on decomposition of the compound. Such alkali metal compounds include the hydroxides and carbonates such as sodium and potassium hydroxide and sodium and potassium carbonate as well as the corresponding oxides. If desired both the disulfide and alkaline material may be incorporated on a porous or other support as by mixing, impregnation, or deposition.

In general, the promoter is incorporated in minor proportions, with a preferred range of about 0.5 to 5 weight per cent of the disulfide. Other hydrogenation catalysts may be admixed with the promoted disulfide but the promoted disulfide is preferably used alone. When utilized for the synthesis of liquid hydrocarbons and oxygenated components, a synthesis gas mixture of CO and $H_2$ in the proportions of about 2 volumes of hydrogen for each volume of carbon monoxide is preferred although the $H_2/CO$ ratio may vary from 1:1 to 3:1. The reaction temperature for hydrocarbon synthesis is in the range of 400–600° F. with a preferred range of 475–550° F. Pressures of atmospheric or higher may be used, for example up to 100 atmospheres or higher. In general low superatmospheric pressures are preferred.

The following is a tabulation of data obtained when operating with the unpromoted molybdenum disulfide, molybdenum disulfide with chromia, molybdenum disulfide with thoria and molybdenum disulfide with alumina. It is seen from these data that the unpromoted catalyst was highly active with respect to methane formation but that liquid product formation was nil. The data further illustrate the ineffectiveness of the oxides of chromium, thorium and aluminum as promoters.

| Catalyst | °F. | P.s.i.g. | Space Velocity | Per Cent CO Conversion | Per Cent Converted CO Converted to $C_3+$ Hydrocarbon and Organic Oxygenated Compounds |
|---|---|---|---|---|---|
| $MoS_2$ | 480 | 200 | 90 | 57 | 0 |
| Do | 540 | 200 | 86 | 95 | 0 |
| Do | 770 | 200 | 100 | 98 | 0 |
| $MoS_2$—29% $ThO_2$ | 480 | 200 | 113 | None | 0 |
|  | 550 | 200 | 106 | 99 | 0 |
|  | 650 | 200 | 106 | 98 | 0 |
| $MoS_2$—25% $Cr_2O_3$ | 485 | 200 | 80 | 65 | 0 |
|  | 540 | 200 | 103 | 97 | 0 |
| $MoS_2$—30% $Al_2O_3$ | 475 | 200 | 83 | 46 | 0 |
|  | 535 | 200 | 107 | 96 | 0 |

Liquid product was obtained when operating with 2 to 3 per cent KOH on $MoS_2$ as shown

| $MoS_2$—2–3% KOH | 530 | 200 | 183 | 69 | 30 |
|---|---|---|---|---|---|

A fractional distillation of the liquid product obtained in the test using the catalyst of this invention indicated the following composition:

| Component | Mol Per Cent |
|---|---|
| $C_3$ | 1 |
| $C_4$'s | 11 |
| $C_5$'s | 22 |
| 40–57° C | 22 |
| 57–67° C | 29 |
| 71–85° C | 4 |
| Above 85° C | 11 |
|  | 100 |

Hydrogenation of unsaturated hydrocarbons, vegetable oils, and the like, may be carried out with highly effective results utilizing the same catalyst, under hydrogenation conditions known to the art.

I claim:

1. A process for the hydrogenation of oxides of carbon which comprises contacting said compounds under hydrogenating conditions with a catalyst comprising a major proportion of molybdenum disulfide and a minor proportion of an alkaline compound of an alkali metal.

2. A process for the synthesis of normally liquid hydrocarbons and organic oxygenated compounds from carbon monoxide and hydrogen mixtures which comprises contacting such mixtures under conversion conditions with a catalyst comprising a major proportion of molybdenum disulfide promoted with a minor porportion of an alkaline compound of an alkali metal.

3. A process according to claim 2 wherein the disulfide is promoted with a minor proportion of potassium hydroxide.

4. A process according to claim 3 wherein the potassium hydroxide is in the proportion of 0.5 to 5 per cent of the disulfide by weight.

5. A process for the synthesis of normally liquid hydrocarbons and organic oxygenated compounds which comprises contacting a gaseous mixture comprising hydrogen and carbon monoxide with a catalyst comprising a major proportion of molybdenum disulfide promoted with a minor proportion of an alkaline compound of an alkali metal at a temperature within the range of 400 to 600° F. and at a superatmospheric pressure not above 100 atmospheres.

6. A process according to claim 5 wherein the gaseous mixture contains hydrogen and carbon monoxide in a volume ratio within the range of 1:1 to 3:1.

7. A process according to claim 5 wherein the molybdenum disulfide is promoted with potassium hydroxide in the proportion of 0.5 to 5 per cent by weight of the disulfide.

S. GRANT STEWART.

REFERENCES CITED

The following references are of record in the file of this patent:

UNITED STATES PATENTS

| Number | Name | Date |
|---|---|---|
| 1,201,850 | Mittasch et al. | Oct. 17, 1916 |
| 1,801,382 | Wietzel et al. | Apr. 21, 1931 |
| 2,243,897 | Fischer et al. | June 3, 1941 |
| 2,284,468 | Burk et al. | May 26, 1942 |
| 2,351,094 | Blaker | June 13, 1944 |